Nov. 2, 1943.            R. G. BALLARD            2,333,406
                      TELEMETERING SYSTEM
                      Filed Dec. 29, 1941
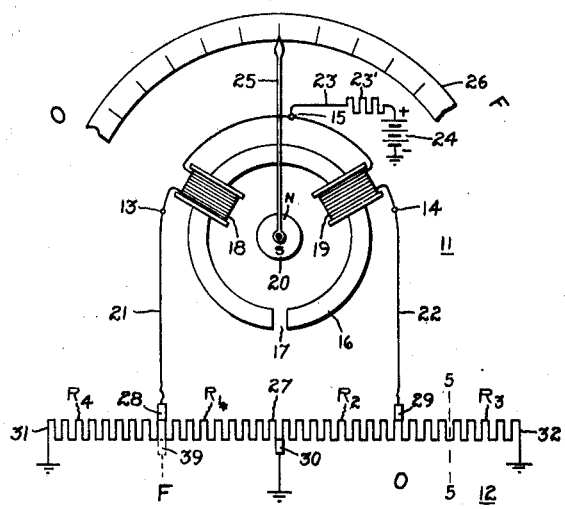
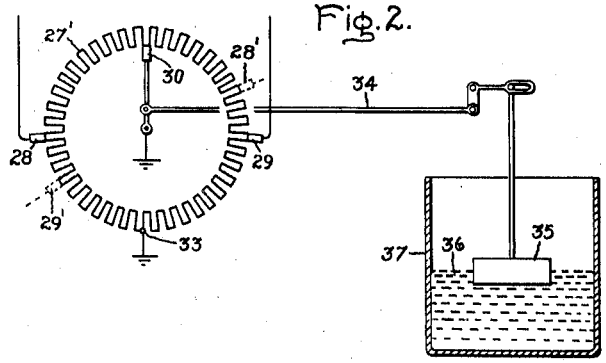
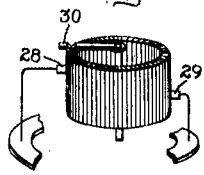
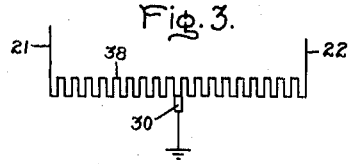
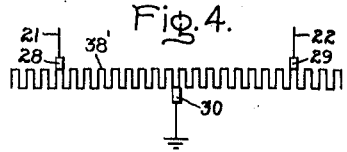
Inventor:
Robert G. Ballard,
by Harry E. Dunham
His Attorney.

Patented Nov. 2, 1943

2,333,406

UNITED STATES PATENT OFFICE 2,333,406

TELEMETERING SYSTEM

Robert G. Ballard, Saugus, Mass., assignor to General Electric Company, a corporation of New York Application December 29, 1941, Serial No. 424,779

8 Claims. (Cl. 177—351)

My invention relates to telemetering arrangements and concerns particularly remote position indicating arrangements.

It is an object of my invention to provide an improved reversible telemetering system employing only two conductors other than a ground connection between the transmitter and receiver, and in which the transmitter may have a single grounded position-indicating movable brush.

A further object of my invention is to provide a transmitter for a telemetering system with adjustments of the full scale and zero positions of the receiver without affecting the zero point of the scale by adjustment of the full scale, or vice versa.

Other and further objects will become apparent as the description proceeds.

In carrying out my invention in its preferred form I employ a receiver of a type which has three terminals and is responsive to the relative values of currents supplied through branch circuits from two of the terminals to the other, and I provide a transmitter consisting of a resistor grounded at the ends with a pair of adjustable brushes cooperating with the resistor each connected to one of the terminals of the receiver and with a third adjustable brush, which is grounded and is movable along the resistor in the space between the first two brushes in response to variations in the position which is to be transmitted to the receiver. A current source such as a battery of cells is connected on one side to the third terminal of the receiver and is grounded on the other side.

A better understanding of my invention will be afforded by the following detailed description considered in connection with the accompanying drawing, and those features which I believe to be novel and patentable will be pointed out in the claims appended hereto.

In the drawing Fig. 1 is an electric circuit diagram schematically representing one embodiment of my invention; Fig. 2 is a schematic diagram of a modified form of transmitter which may be employed in the telemetering system of Fig. 1; Fig. 3 is a schematic diagram of a further modification of the transmitter; Fig. 4 is a schematic diagram of still another embodiment of the invention; Fig. 5 is a cross-sectional view of the transmitter of Fig. 1; and Fig. 6 represents a circular transmitter structure using resistance wire wound axially inside and outside of a tubular insulating form. Like reference characters are utilized throughout the drawing to designate like parts.

In Fig. 1 there is illustrated an embodiment of the invention which may be employed for producing deflection of a pointer in a receiver or indicating instrument in response to motion of a member located at a transmitting point, thus forming a remote position indicator. The telemetering system comprises a receiver 11 and a transmitter 12. The receiver is of the three-terminal type and may be in the form of a ratio instrument or any other instrument in which deflection is produced in response to variations in the relative value of two electrical effects, such as voltage or currents supplied to the receiver. The receiver 11 is shown as having two terminals 13 and 14 of one polarity and a third terminal 15 serving as a junction terminal or a terminal of opposite polarity. The arrangement is such that the receiver 11 acts in response to variations in the relative values of currents flowing in branch circuits between the terminals 13 and 15 and between the terminals 14 and 15.

The receiver 11 may take the form of a telemeter receiver having the mechanical structure described in the copending application of Richard G. Jewell, Telemetering system, Serial No. 359,290, filed October 1, 1940, and assigned to the same assignee as the present application. A modified electrical connection is employed, however. As illustrated schematically in Fig. 1, the receiver 11 comprises an annular core 16 of relatively permeable magnetic material having an air gap at a point 17 in the periphery thereof, a pair of current-conducting coils 18 and 19 linking the core 16, and a movable element in the form of a transverse magnetized cylindrical permanent magnet 20 pivoted on its axis and composed of high coercive force permanent magnet material. The coils 18 and 19 are preferably arranged symmetrically with respect to the diameter of the annular core 16 which passes through the air gap 17 if a symmetrical scale is desired.

The current-conducting coil 18 is connected between the receiver terminals 13 and 15, and the current-conducting coil 19 is connected between the receiver terminals 14 and 15. The terminals 13 and 14 are connected to conductors 21 and 22, respectively, leading from the transmitter 12; and the terminal 15, which serves as a junction terminal for the coils 18 and 19, is connected to a conductor 23, which is connected through a protective resistance 23' to one side of a current source 24, which may be either A. C. or D. C. according to the type of receiver, but which is shown as a battery of dry cells, the other side of which is grounded. For example, the positive terminal is connected to the conductor 23 and the negative terminal is grounded. The coils 18 and 19 are connected to act in opposition so that they produce a magnetic flux crossing the annular core 16 diametrically and reacting with the rotor 20. Thus the angular direction of the diametrical flux and the position assumed by the rotor 20 depends upon the relative magnitudes of the currents in the coils 18 and 19 or the voltages applied thereto. The rotor 20 is mechanically connected to a suitable device such as a pointer 25 cooperating with a scale 26.

The transmitter 12 comprises a resistor 27, a pair of scale adjustment brushes 28 and 29 connected to the conductors 21 and 22, respectively, and an indication-producing movable brush 30. The ends 31 and 32 of the resistor 27 and the indication-producing brush 30 are electrically connected to a point at the same potential as the side of the current source 24 which is not connected to the receiver 11. In practice the resistor ends 31 and 32 and the brush 30 are grounded. The resistor 27 may either be straight to correspond to the float gage in Fig. 2 of Patent No. 2,248,616, Faus, or circular to correspond to Fig. 1 of the said Faus patent, wherein three conductors and two indication-producing transmitter brusher are employed. The telemetering system of the present application is therefore applicable to the transmission of indications responsive to either straight line or circular motion, although it employs only one indication-producing brush, which may be grounded.

If the transmitter resistor is circular, as represented by the resistor 27' of Fig. 2, it may take the form of a continuous toroidal resistor grounded at some point on the periphery such as the point 33. In the case of either Fig. 1 or Fig. 2, the transmitter resistor forms an electrically continuous element, i. e., an element with a continuous or closed current path, grounded at one electrical point.

The telemetering system is not limited to the transmission of indications of a particular kind. However, by way of example, it is shown in Fig. 2 as being employed in connection with a float gage having an arm 34 mechanically connected to the rotatable brush 30 at one end and mechanically connected at the other end to a float 35 adapted to move in response to variations in the level of a body of liquid 36 such as gasoline, for example, in a tank 37.

If adjustment of the zero and full scale points of the receiver 11 is not required the connections of the conductors 21 and 22 to the resistor 27 may be made fixed and the portions of the resistor 27 beyond the conductor connections may be eliminated as illustrated in Fig. 3, where the transmitter consists of a resistor 38, connected at the ends to the conductors 21 and 22, and the single grounded movable brush 30.

It will be observed that the telemetering system illustrated in the various figures of the drawing, has the advantage of requiring only two conductors other than the ground connection between the transmitting and receiving points, viz: the conductors 21 and 22. It has the further advantage that the movable brush 30, i. e., the indication-responsive or indication-producing brush of the transmitter is grounded.

This eliminates the necessity for any insulation between the brush 30 and the shaft or other movable element carrying the brush and moving in response to motion of a device such as a tank float 35, the position of which is to be indicated at a distance.

Considering first the operation of the particular form of the invention represented by the transmitter of Fig. 3, and a suitable receiver such as the receiver 11 of Fig. 1, it will be observed that variation in the position of the brush 30 on the resistor of the transmitter produces variations in the relative resistances of the respective branch circuits represented by the conductors 21 and 22. These variations in the position of the transmitter brush 30, therefore, produce variations in the relative currents flowing in the coils 18 and 19 and in the relative voltages applied thereto. Motion of the brush 30 along the transmitter resistor accordingly produces a deflection of the receiver pointer 25 along its scale 26.

In connection with many types of telemetering systems such as float gages, for example, it is difficult to design a telemetering system and float linkages in such a manner that the pointer 25 will be precisely on the zero point of its scale when the float 35 is at its lowermost position in the tank 37 and the receiver pointer 25 will be at its full scale position when the float 35 is in its uppermost position in the tank 37. Furthermore, it is desirable to have the telemetering system adaptable to use with different tanks and linkages. Adjustment of the zero and full scale positions of the pointer 25 may be accomplished by providing adjustable connections between the conductors 21 and 22, respectively, and the ends of the transmitter resistor 38 of Fig. 3. As illustrated in Fig. 4 the length of the transmitter resistor 38 is increased somewhat to form the resistor 38' and the adjustment brushes 28 and 29 are provided at the ends of the conductors 21 and 22, respectively. Adjustment of the zero point by adjustment of the brush 28 will have some effect on the full scale point and adjustment of the full scale point by movement of the brush 29 will have some effect on the zero point of the receiver, if the arrangement of Fig. 4 is employed.

In order to make an adjustment at either end of the scale 26 substantially independent of adjustment at the other end of the scale by means of the adjustment brushes 28 or 29, the arrangement of Figs. 1 and 2 is employed. The zero and full scale ends of the scale 26 are represented by the symbols "0" and "F." The zero and full scale positions of the brush 30 are at or near the adjustment brushes 29 and 28 respectively. The actual positions depend upon the dimensions of the tank 37, float 35, the linkage 34, etc. It will be observed that the portion of the transmitter resistor 27 between the adjustment brushes 28 and 29 is divided into two parts R—1 and R—2 by the position-indicating brush 30. End portions R—3 and R—4 are also formed. My invention is not limited to the use of the particular electrical values or dimensions of the various elements, but I prefer to make the resistance of each of the portions R—3 and R—4 approximately equal to the total resistance of R—1 and R—2. I have found that satisfactory results may be obtained by making these resistances (R—3 and R—4) about 440 ohms each with 125 ohm receiver coils, a protective series resistor 23' of about 100 ohms, and a 12 volt battery as the current source 24.

The effect of the portions R—3 and R—4 of the resistor 27 may be seen by assuming that the position-responsive transmitter brush 30 is moved to the position 39, the assumed full scale position, in which the brush is shown in dotted lines. In this position the resistance R—4 is shorted out. The resistance R—3 is in parallel with resistances R—1 and R—2 and the resistances of these two in parallel is 220 ohms which limits the current through the receiver coil 19 and causes full voltage to be applied across the receiver coil 18. The pointer 25 deflects toward full scale, F. Let it be assumed that the adjustment brush 29 is then moved toward the end 31 of the resistor 27 by an amount equal to 10 per cent of the resistance R—1 plus R—2 for the purpose of correcting the full scale indication. This may be necessary in order to use the telemetering system with a tank which does not allow the float 35 to rise as far as in the usual tanks. The resistance of R—1 plus R—2 is reduced from 440 ohms to 396 ohms and the resistance of R—3 is increased from 440 ohms to 484 ohms. Nevertheless, the parallel resistance of R—1 plus R—2 and R—3 has been changed only from 220 ohms to 218 ohms. Thus no appreciable change in indication is produced at the zero end of the scale, even though the full scale end has been adjusted by ten per cent. The effect of a zero adjustment by means of the adjustment brush 28 may be observed in like manner by assuming the position-responsive brush 30 to have been moved opposite the adjustment brush 29, the assumed zero position for the brush 30.

If adjustment at only one end of the scale is desired, one of the adjustment brushes 28 or 29 and the associated end portion of the resistor 27 may be omitted. For example, if a control magnet of the type described in Patent No. 2,181,803, Faus, is employed which tends to eliminate the error produced at one end of the scale, one end of the resistor 27 such as end R—4, for example, may be omitted.

It will be understood that the effect of the movement of the adjustment brushes 28 and 29 in Fig. 2 will be similar to that described in connection with Fig. 1. The circular arrangement of Fig. 2 permits the adjustment brushes 28 and 29 to be moved to any portion of the resistor 27' readily and if the relative positions of the adjustment brushes 28 and 29 are interchanged as represented by the position of the brushes 28' and 29' shown in dotted lines, the direction of deflection of the receiver pointer 25 may be reversed so that the scale 26 is in effect turned end for end. For providing this feature on the straight transmitter of Fig. 1, I may mount the brushes on different sides of the resistor 27, as shown in the sectional view, Fig. 5. The direction of indicator deflection may be reversed also by interchanging the leads 21 and 22 at either the transmitter or the receiver.

I have herein shown and particularly described certain embodiments of my invention and certain methods of operation embraced therein for the purpose of explaining its practice and showing its application, but it will be obvious to those skilled in the art that many modifications and variations are possible, and I aim therefore to cover all such modifications and variations as fall within the scope of my invention which are defined in the appended claims.

What I claim as new and desire to secure by Letters Patent of the United States is:

1. A telemetering system comprising a transmitter, a receiver and a two-terminal current source, the receiver being of the type which has a pair of branch circuits and is responsive to the relative magnitude of electrical effects in the branch circuits, the transmitter comprising a resistor connected to form an electrically continuous circuit with a terminal connected to one point thereof, a pair of scale adjustment brushes movable along the resistor and a transmitter position-responsive brush also movable along the resistor at the portion thereof between the first-mentioned pair of brushes, each of the first pair of brushes being connected to one of the branch circuits of the receiver, the receiver having a junction point of both branch circuits connected to the terminal of one polarity of the current source, the said transmitter terminal and the position responsive brush thereof being connected to the current-source terminal of opposite polarity.

2. A telemetering system comprising a transmitter, a receiver and a current source having first and second terminals, said receiver being of the type which has a pair of current conducting coils and which is responsive to the relative magnitude of electrical effects in said coils, the transmitter comprising a resistor electrically connected to form a continuous electrical circuit with a terminal connected thereto, a pair of scale adjustment brushes adapted to make electrical contact with points on the resistor which may be varied for adjustment of zero and full scale indications of the receiver, and a transmitter position-responsive brush adapted to make contact with points along the resistor between the first two brushes, said points of contact of the position responsive brush being variable in response to variations in the position to be transmitted, each of the receiver coils having a terminal connected to one of the transmitter adjustment brushes and having a junction terminal connected to the first terminal of the current source, the second terminal of the current source, the said transmitter terminal and the position responsive transmitter brush being grounded.

3. A transmitter for a telemetering system of the type having a two-terminal current-source energizing branch circuits, the relative electrical effects in which are varied in response to variations in an indication to be transmitted, said transmitter comprising a resistor electrically connected to form a continuous electrical path with a terminal connected to a point thereof adapted to be connected to one terminal of the current source, a pair of scale adjustment brushes adapted to make electrical contact with two points on the resistor which points may be varied for scale adjustment and a third brush adapted to make contact with points on the resistor variable in response to indications to be transmitted, the first two brushes being adapted to be energized in branch circuits with the same polarity at any given instant while the third brush and the said transmitter terminal are adapted to be energized with the opposite polarity.

4. A transmitter for a telemetering system of the type having branch circuits the relative electrical effects in which are varied in response to variations in an indication to be transmitted and which are adapted to be energized from a current source having two terminals of opposite polarity at any given instant, said transmitter comprising a substantially circular resistor, a pair of scale adjustment brushes adapted to make electrical contact with adjustable points along the resistor adapted to be included in branch circuits and energized at the same polarity at a given instant, a third brush rotatably mounted and adapted to be moved along the resistor in response to variations in an indication to be transmitted, and a terminal on the resistor electrically connected to the third brush and adapted to be energized at any given instant with an opposite polarity to the first pair of brushes.

5. A telemetering system comprising a transmitter, a receiver, and a current source, the current source having a pair of terminals, the receiver being of the type which has a pair of branch circuits and which is responsive to variations in electrical effects in the branch circuits, the transmitter comprising a resistor with a terminal connected to one end point thereof, a pair of connections between points on the resistor and the branch circuits of the receiver, that one of said connections which is nearer the transmitter terminal being adjustable for adjusting the receiver scale, and a brush adapted to make electrical connection to points on the resistor varied in response to variations in indications to be transmitted, the receiver having a junction terminal common to the branch circuits connected to one terminal of the current source and the other terminal of the current source being electrically connected to the said transmitter terminal and to the transmitter brush.

6. A transmitter for a telemetering system of the type having branch circuits the relative effects in which are varied in accordance with variations of an indication to be transmitted, said transmitter comprising, in combination with a source of supply, a resistor connected to form a continuous path, a pair of transmitter connections to the resistor connected in parallel receiver circuits to one side of said source of supply, a brush adapted to make contact with different points along said resistor in response to variations to be transmitted, and a terminal connected to a fixed point of said resistor and connected with said brush to the other side of said source of supply, one of said transmitter connections being adjustable along said resistance for scale adjustment.

7. A transmitter for a telemetering system of the type having branch circuits the relative effects in which are varied in accordance with variations of an indication to be transmitted comprising in combination with a source of supply, one side of which is grounded, a resistor connected to form a continuous path, a pair of transmitter connections to the resistor connected in parallel receiver circuits to the ungrounded side of said source of supply, a brush adapted to make contact with different points along said resistor in response to variations to be transmitted, and a terminal connected to a fixed point of said resistor and connected with said brush to ground.

8. A transmitter for a telemetering system of the type having a two-terminal current-source energizing branch circuits, the relative electrical effects in which are varied in response to variations in an indication to be transmitted, said transmitter comprising a resistor electrically connected to form a continuous electrical path with a terminal connected to a point thereof adapted to be connected to one terminal of the current source, a pair of scale adjustment brushes adapted to make electrical contact with two points on the resistor which points may be varied for scale adjustment and a third brush adapted to make contact with points on the resistor variable in response to indications to be transmitted, the first two brushes being adapted to be energized in branch circuits with the same polarity at any given instant while the third brush and the said transmitter terminal are adapted to be energized with the opposite polarity, the resistances of the portions of the said resistor between its said terminal and the said adjustment brushes being of substantially the same order of magnitude as the resistance of the portion of the resistor between said adjustment brushes.

ROBERT G. BALLARD.